United States Patent
Lee et al.

(10) Patent No.: US 9,805,749 B1
(45) Date of Patent: Oct. 31, 2017

(54) HEAT-ASSISTED MAGNETIC RECORDING DRIVE ENCLOSURE WITH ARCUATE CHANNEL FOR ACCOMMODATING LASER DIODE UNIT

(71) Applicant: Seagate Technology LLC, Cupertino, CA (US)

(72) Inventors: Chuen Buan Lee, Singapore (SG); Tim Rausch, Farmington, MN (US); Xiong Liu, Singapore (SG); Qiang Bi, Singapore (SG)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/094,055

(22) Filed: Apr. 8, 2016

(51) Int. Cl.
*G11B 11/00* (2006.01)
*G11B 5/48* (2006.01)
*G11B 5/00* (2006.01)

(52) U.S. Cl.
CPC ............ *G11B 5/4826* (2013.01); *G11B 5/484* (2013.01); *G11B 5/4833* (2013.01); *G11B 5/4866* (2013.01); *G11B 5/4873* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,821,741 B2 | 10/2010 | Abustan, Jr. et al. | |
| 8,065,786 B2 | 11/2011 | Shimazawa et al. | |
| 8,467,276 B2* | 6/2013 | Hirata | G11B 5/4866 369/13.13 |
| 8,537,646 B2* | 9/2013 | Hirata | G11B 5/486 369/13.33 |
| 8,542,559 B2* | 9/2013 | Hirata | G11B 5/4866 369/13.13 |
| 8,638,645 B1* | 1/2014 | Nishijima | G11B 5/1272 369/13.13 |
| 8,854,932 B2* | 10/2014 | Isoshima | G11B 13/08 369/13.13 |
| 8,923,099 B2 | 12/2014 | Naniwa et al. | |
| 8,929,180 B1* | 1/2015 | Huber | G11B 5/012 360/244.3 |
| 2010/0085664 A1* | 4/2010 | Hirata | G11B 5/4833 369/13.33 |
| 2010/0195450 A1* | 8/2010 | Sasaki | G11B 5/314 369/13.24 |
| 2011/0075527 A1* | 3/2011 | Hirata | G11B 5/4833 369/13.33 |
| 2011/0085270 A1 | 4/2011 | Hirano et al. | |
| 2012/0134246 A1 | 5/2012 | Shimazawa | |

(Continued)

*Primary Examiner* — Tan X Dinh
(74) *Attorney, Agent, or Firm* — Hollingsworth Davis, LLC

(57) ABSTRACT

An apparatus comprises a heat-assisted magnetic recording drive which includes an enclosure having a base and a cover. The drive includes a magnetic recording disk and a head gimbal assembly proximate one of the base and the cover. The HGA supports a slider assembly comprising a laser diode unit. The LDU projects away from the HGA towards one of the base and the cover. An arcuate channel is provided in one of the base and the cover and dimensioned to receive a distal portion of the LDU. The channel has a length that accommodates the distal portion of the LDU along a stroke of the HGA.

20 Claims, 6 Drawing Sheets

(56) References Cited

U.S. PATENT DOCUMENTS

2013/0148231 A1    6/2013  Huang et al.
2015/0247722 A1*   9/2015  Takayama ............ G01B 11/272
                                                            369/13.33

* cited by examiner

PRIOR ART

PRIOR ART

PRIOR ART

HEAT-ASSISTED MAGNETIC RECORDING DRIVE ENCLOSURE WITH ARCUATE CHANNEL FOR ACCOMMODATING LASER DIODE UNIT

SUMMARY

Embodiments are directed to an apparatus comprising a heat-assisted magnetic recording (HAMR) drive which includes an enclosure having a base and a cover. The drive comprises a magnetic recording disk and a first head gimbal assembly (HGA) proximate the cover. The first HGA supports a first slider assembly comprising a first laser diode unit (LDU). The first LDU projects away from the first HGA towards the cover. A second HGA proximate the base supports a second slider assembly comprising a second LDU. The second LDU projects away from the second HGA towards the base. A first arcuate channel is provided in the cover and dimensioned to receive a distal portion of the first LDU. The first channel has a length that accommodates the distal portion of the first LDU along a stroke of the first HGA. A second arcuate channel is provided in the base and dimensioned to receive a distal portion of the second LDU. The second channel has a length that accommodates the distal portion of the second LDU along a stroke of the second HGA.

Some embodiments are directed to an apparatus comprising a heat-assisted magnetic recording drive which includes an enclosure having a base and a cover. The drive comprises a magnetic recording disk and at least one head gimbal assembly proximate one of the base and the cover. The HGA comprises a load beam having a first surface, a second surface opposing the first surface, and an aperture. A suspension is connected to the second surface of the load beam and configured to support a slider assembly comprising a laser diode unit. The LDU extends through the aperture of the load beam and projects away from the first surface toward one of the base and the cover. An arcuate channel is provided in one of the base and the cover. The channel is dimensioned to receive a distal portion of the LDU and has a length that accommodates the distal portion of the LDU along a stroke of the HGA.

Other embodiments are directed to an apparatus comprising a heat-assisted magnetic recording drive which includes an enclosure having a base and a cover. The drive includes a magnetic recording disk and a head gimbal assembly proximate one of the base and the cover. The HGA supports a slider assembly comprising a laser diode unit. The LDU projects away from the HGA towards one of the base and the cover. An arcuate channel is provided in one of the base and the cover and dimensioned to receive a distal portion of the LDU. The channel has a length that accommodates the distal portion of the LDU along a stroke of the HGA.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure is generally directed to hard disk drives configured for heat-assisted magnetic recording (HAMR), also referred to as thermally assisted magnetic recording (TAMR), which can be used to increase areal data density of magnetic media. Embodiments of the disclosure are directed to low form factor HAMR drives (e.g., 7 mm and 5 mm form factors) having modified housings that accommodate multiple HAMR sliders while maintaining the low form factor. Embodiments are directed to a HAMR drive housing that incorporates an arcuate channel dimensioned to accommodate a distal portion of a laser diode unit of a HAMR slider that could otherwise destructively contact the housing during manufacture and operation of the HAMR slider. Generally, a HAMR slider (also referred to as a read/write head or a recording head) includes electromagnetic components similar to a conventional magnetic hard drive slider, such as a writer and a reader. A HAMR slider also includes a source of energy (e.g., a laser) used for heating a small spot on a magnetic media (e.g., disk). The laser energy is used to excite a near-field transducer near the magnetic writer to create a precisely focused thermal spot on the magnetic media. A HAMR drive uses a magnetic storage media with higher coercivity than conventional magnetic media, and the hotspot temporarily lowers the coercivity so that data can be written to the heated area. This allows for a significantly higher areal density to be achieved than with current magnetic recording technologies.

Figure 1:
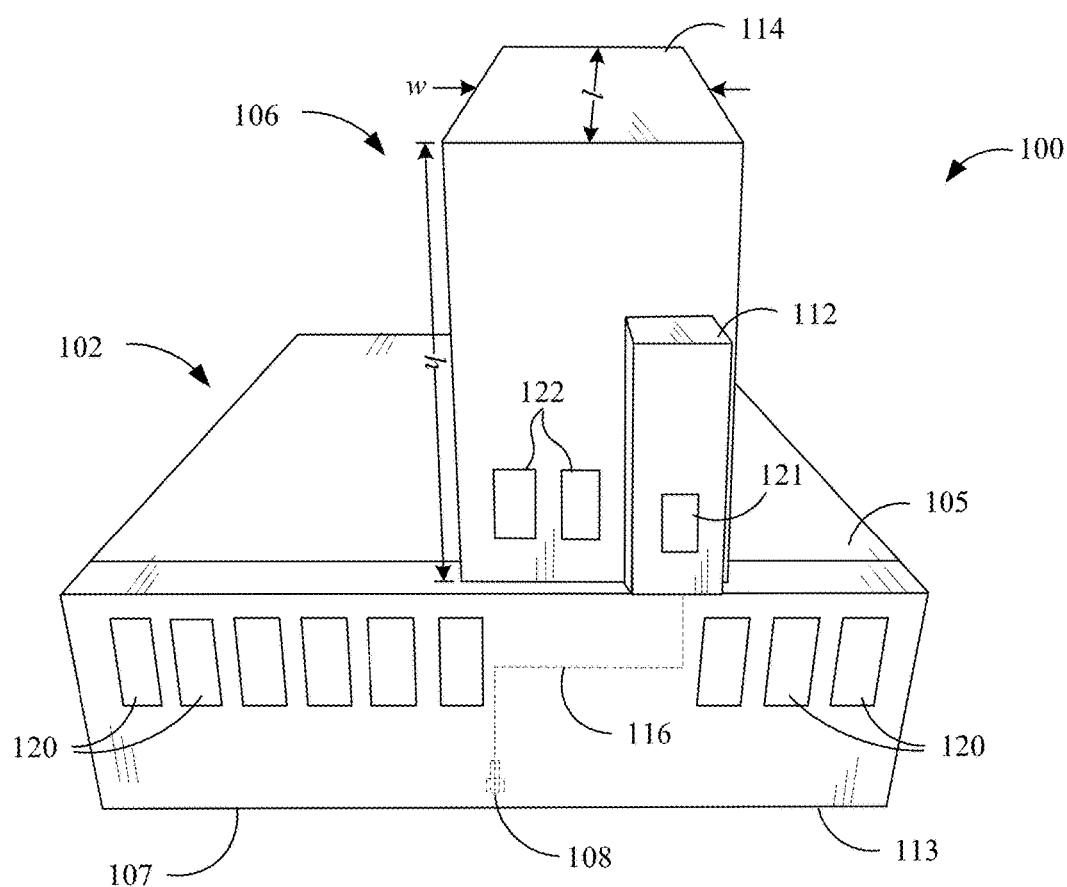
FIG. 1 is a perspective view of a hard drive slider that includes a laser diode unit mounted thereon in accordance with various embodiments.

In a number of HAMR designs, a laser is manufactured separately from the slider which includes one or more read heads and write heads. During manufacture, the laser is physically attached to the slider, a typical configuration of which is referred to as laser-on-slider (LOS). In FIG. 1, a perspective view shows an LOS assembly 100 according to a representative embodiment.

The slider assembly 100 includes a slider body 102 having a media-facing surface 113 and a top surface 105. The media-facing surface 113 faces a magnetic media surface (e.g., disk surface, not shown) during operation. A read/write head region 108 is located at the media-facing surface 113 near a trailing edge 107 of the slider body. The read/write head region 108 includes respective one or more read transducers and write transducers, as well as an optical component (e.g., a near-field transducer or NFT) that directs a small beam of energy onto the media surface. The read/write head region 108 generally includes an alumina overcoat. The energy is provided by a laser diode 112 attached to a submount 114, both of which are attached to the top surface 105 of the slider body 102. The laser diode 112 mounted to the submount 114 is referred to herein as a laser diode unit 106. The laser diode 112 and submount 114 are formed separately and later attached together (e.g., using pick and place then solder reflow bonding) with the slider body 102 to form the LDU 106 of the slider assembly 100. The slider body 102, laser diode 112, and submount 114 have electrical connecting pads 120-122 that attach with other structures that are part of what is referred to as a head-gimbal assembly.

The laser diode 112 of the LDU 106 directs light to an optical interface (not shown) of the slider body 102, where it is coupled to a waveguide 116 that directs light to the NFT near the read/write head region 108. The laser diode 112 in this example is an edge-emitting laser diode, and may be coupled to the waveguide 116 via a facet, grating, lens or other coupling structure known in the art. Generally, the slider body 102 is an integrated optics device that is formed together with the waveguide 116 and read/write head region 108.

Figure 2A:
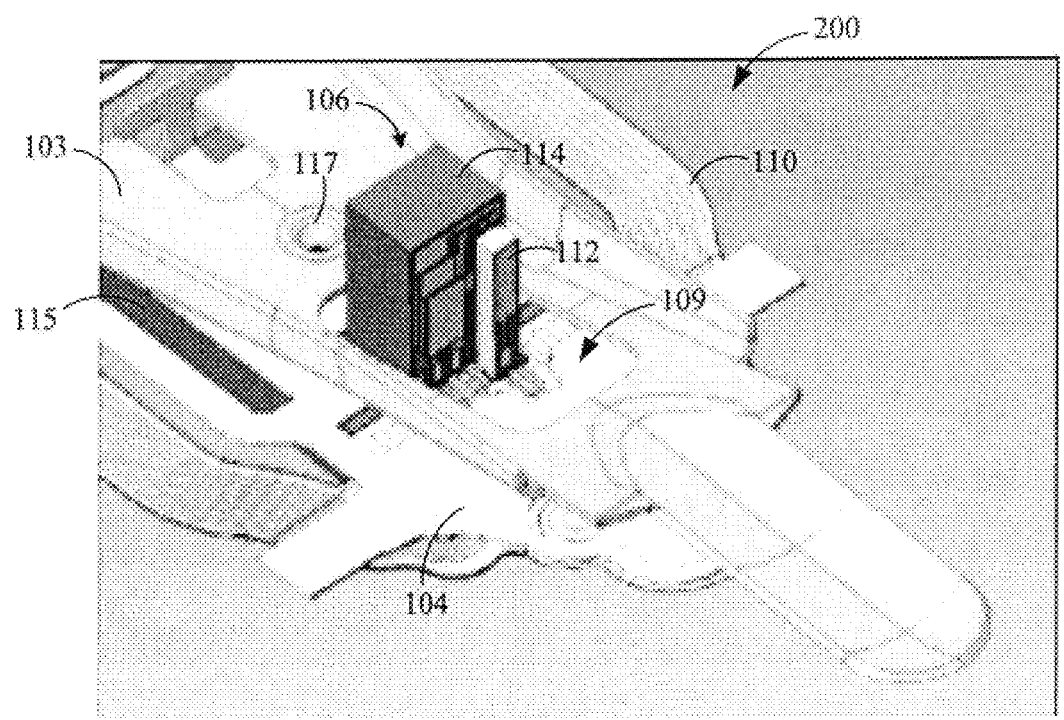
FIG. 2A is a top perspective view of a distal portion of a head gimbal assembly that includes a slider and laser diode unit supported by a suspension in accordance with embodiments of the disclosure.
Figure 2B:
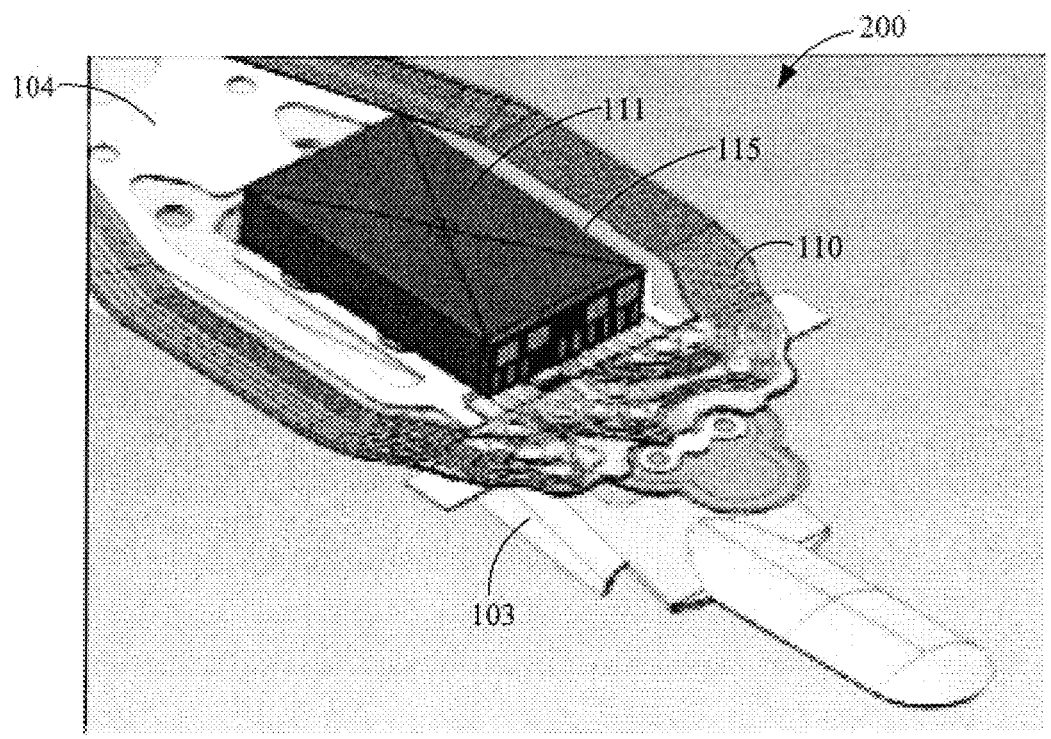
FIG. 2B is a bottom perspective view of the head gimbal assembly shown in FIG. 2A.

FIG. 2A is a top perspective view of a head gimbal assembly 200 that includes a slider 115 and laser diode unit 106 supported by a suspension 104 in accordance with embodiments of the disclosure. FIG. 2B is a bottom perspective view of the portion of the HGA 200 shown in FIG. 2A. In the embodiment shown in FIGS. 2A and 2B, the suspension 104 is connected to a load beam 103 of the hard drive's actuator assembly. The slider 115 is best seen in the bottom perspective view of FIG. 2B, with the air bearing surface 111 defining the lower surface of the slider 115. The slider 115 is mounted to the suspension 104 which is connected to the load beam 103 at a single connection point 117, such as at a dimple connection. The single connection point 117 allows the slider 115 to articulate along multiple axes, such as a pitch axis and a roll axis, during operation. The load beam 103 includes an aperture 109 through which the LDU 106 protrudes, which allows for free movement of the LDU 106 as the suspension 104 is subject to aerodynamic forces and displacement during operation. Depending on the particular design, the LDU 106 can extend upwardly from the slider 115 to a height (h) between about 320 μm and 420 μm, have a length (l) of about 180 μm, and a width (w) of about 300 μm (see h, l, and w shown in FIG. 1). A flex circuit arrangement 110 provides electrical connectivity between electrical contact pads of the slider 115 and various electronics of the hard drive.

Figure 3:
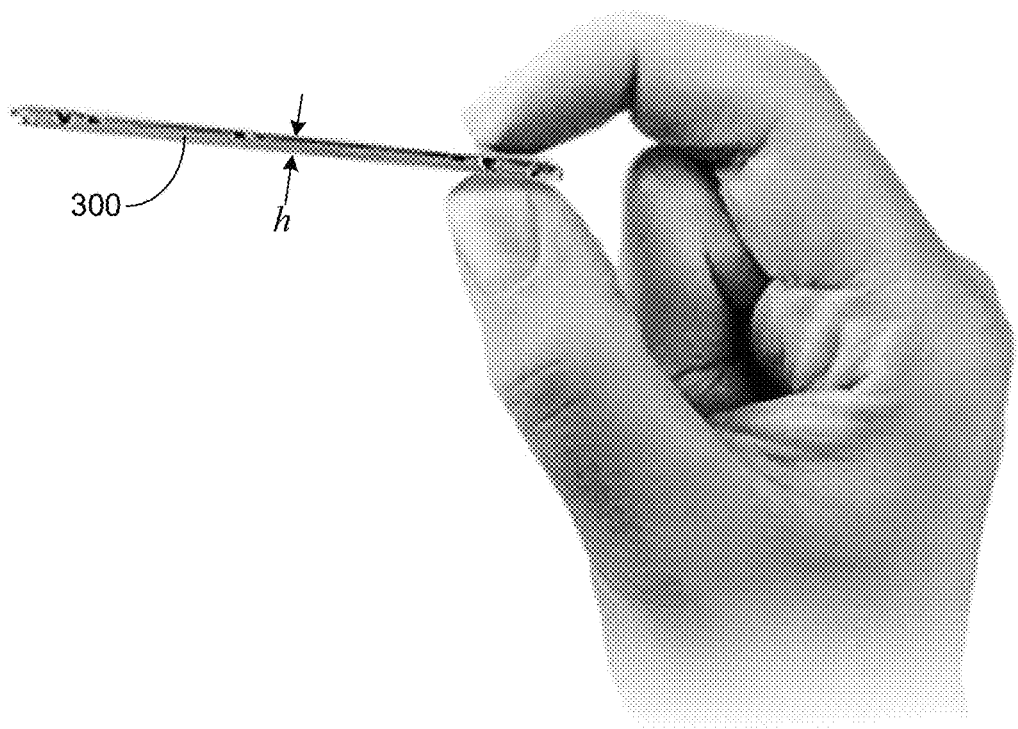
FIG. 3 shows a representative conventional hard drive having a 7 mm form factor.

It can be seen in FIGS. 2A and 2B that the LDU 106 projects outwardly a substantial distance in the vertical direction from the load beam of the HGA 200. According to various HAMR slider designs, the LDU 106 can project a distance of between about 55 μm and 155 μm beyond the surface of the HGA 200 (in the vertical direction relative to a horizontal plane of the HGA 200). For low form factor HAMR drives, the outwardly projecting LDU 106 can become problematic during drive manufacture and operation in the field. For example, a low form factor HAMR drive may be specified to have a height (thickness) of 7 mm or 5 mm. A representative conventional hard drive having a 7 mm form factor (e.g., a 7 mm height, h) is shown in FIG. 3. It can be appreciated that accommodating the vertically projecting LDU of one or more HAMR sliders of a low form factor HAMR drive is challenging, during both drive manufacture and operational use in the field.

For example, the limited vertical (height) spacing in such low form factor HAMR drives negatively impacts pinch force testing robustness of the drive during manufacturing. A pinch force test evaluates the stiffness of the top cover. A pinch force test involves pinching the drive enclosure between a round probe on the base cover (placed at different locations) and a press on the top cover, and monitoring the drive's performance. Contact between internal drive components and the top cover results in a degradation in drive throughput performance. It can be appreciated that a tall LDU reduces that gap between the HGA and the top cover (and the base cover). Also, the limited vertical spacing in low form factor HAMR drives limits the vertical travel available to the LDU when responding to operational shock. For example, operational shock experienced by a low form factor HAMR drive can cause the HGA to deflect beyond normal limits, resulting in deleterious contact between the LDU and a planar surface of the cover or base of the drive enclosure.

Embodiments of the present disclosure are directed to a low form factor HAMR drive having an enclosure configured to accommodate one or more LDUs by provision of one or more arcuate channels provided in the enclosure. In some embodiments, an arcuate channel is provided in the cover of a low form factor HAMR drive enclosure that is dimensioned to receive a distal portion of an LDU supported by an HGA as the LDU travels along a stroke of the HGA. In other embodiments, an arcuate channel is provided in the base of a low form factor HAMR drive enclosure that is dimension to receive a distal portion of an LDU supported by the HGA as the LDU travels along a stroke of the HGA. According to other embodiments, an arcuate channel is provided in each of the cover and a base of a low form factor HAMR drive enclosure and respectively dimensioned to receive a distal portion of an LDU supported by a respective HGA as the LDU travels along a stroke of the respective HGA. Provision of an arcuate channel in one or both of the cover and base of a low form factor HAMR drive enclosure enables higher pinch force robustness and allows for LDU travel due to operational shock without contacting the cover and/or base of the enclosure.

Figure 5:
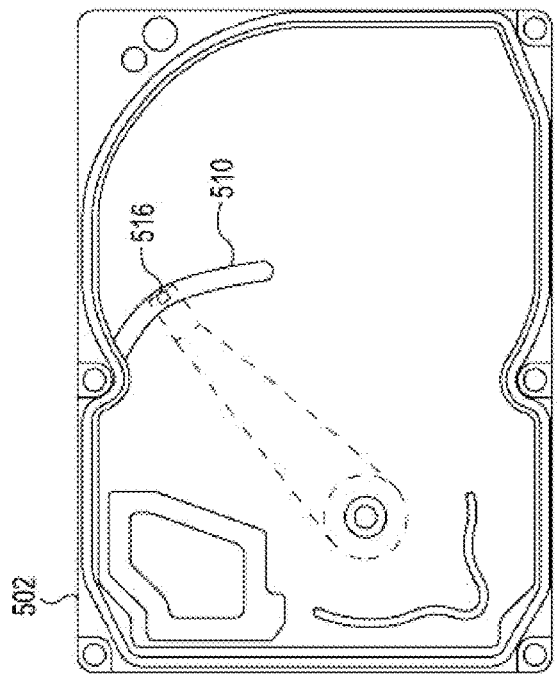
FIG. 5 shows a cover of a low form factor HAMR drive enclosure in accordance with various embodiments.
Figure 4:
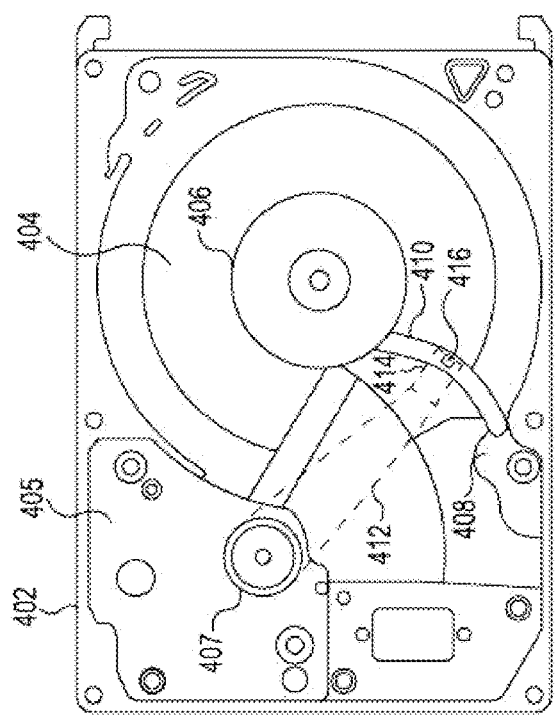
FIG. 4 shows a base of a low form factor HAMR drive enclosure in accordance with various embodiments.

Referring now to FIG. 4, there is illustrated a base 402 of a low form factor HAMR drive enclosure in accordance with various embodiments. FIG. 5 shows a cover 502 of a low form factor HAMR drive enclosure in accordance with various embodiments. The cover 502 shown in FIG. 5 is configured to mount to the base 402 shown in FIG. 4 to define the enclosure of the HAMR drive.

The base 402 is shown to include a number of regions including a recessed region 404 configured to receive a magnetic recording disk (not shown). A spindle motor 406 to which the disk is mounted is situated in the recessed region 404. A VCM (voice coil motor) region 405 is shown to include an actuator assembly mount 407 upon which an actuator assembly (not shown) pivotally rotates. A first actuator arm 412 is shown in dashed lines. A first HGA 414 is shown (in dashed lines) mounted at a distal end of the first actuator arm 412. The first HGA 414 includes a first LDU 416 that projects downwardly toward the surface of the base 402. Because the first HGA 414 is mounted between the bottom surface of the disk and the base 402, the air bearing surface of the slider of the first HGA 414 would be facing out of the page (toward the disk) and the first LDU 416 would be facing into the page (toward the base 402).

The base 402 includes a first channel 410 that has an arcuate shape and extends between the spindle motor 406 and a landing pad 408. The landing pad 408 is a region of the base 402 at which the actuator arm assembly rests during non-operation, for example. The first channel 410 of the base 402 is dimensioned to receive a distal portion of the first LDU 116 along the stroke of the first HGA 414.

The cover 502 of FIG. 5 is shown to include a number of regions that generally complement the regions of the base 402. Notably, the cover 502 includes a second channel 510 that has an arcuate shape and extends between the spindle motor 406 and the landing pad 408 of the base 402 when the cover 502 is attached to the base 502. The second channel 510 is dimensioned to receive a distal portion of a second LDU 516. It is noted that, in some embodiments, a low form factor HAMR drive enclosure can incorporate a single arcuate channel in the base 402 or cover 502, rather than including channels in each of the base 402 and cover 502.

Figure 6:
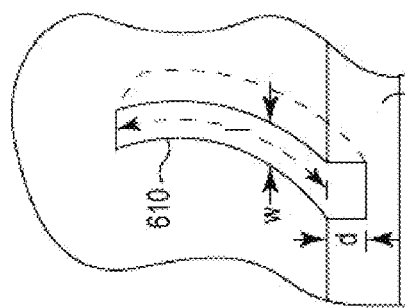
FIG. 6 shows a detailed view of the arcuate channel which is incorporated in an enclosure of a low form factor HAMR drive in accordance with various embodiments.

FIG. 6 shows a detailed view of the arcuate channel 610 incorporated in a structure 602 of the enclosure of a low form factor HAMR drive in accordance with various embodiments. In some embodiments, the enclosure can have a height (h) of 7 mm. In other embodiments, the enclosure can have a height of 5 mm. It is understood that embodiments of the present disclosure are not limited to enclosures having a height of 7 mm or 5 mm, and that other low form factor drive enclosures are contemplated.

The portion 602 of the enclosure shown in FIG. 6 can represent the cover or the base of the enclosure. In general, the channel 610 is dimensioned to accommodate the size of a distal portion of an LDU as the HGA supporting the LDU traverses the stroke of the HGA (e.g., between inner and outer diameters of the disk). The channel 610 typically has a cross-sectional shape that can accommodate the cross-sectional shape of the LDU. According to some embodiments, the channel 610 can have a generally square or rectangular cross-section.

In general, the channel 610 can have a depth, d, that is greater than the height of the portion of the LDU that protrudes beyond the HGA. For example, the channel 610 can have a depth, d, that is greater than the height of the portion of the LDU that protrudes beyond the HGA by at least about 20% (e.g., channel depth (d)=~120% of the height of the portion of the LDU that protrudes beyond the HGA). For an LDU that protrudes between about 55 μm and 155 μm beyond the surface of the HGA 200 (e.g., the HGA rail), for example, the channel 610 can have a depth, d, of between about 66 μm and 186 μm. The channel 610 can have a width, w, that is greater than the width of the LDU. For example, the channel 610 can have a width, w, that is greater than the width of the LDU by about 20% (e.g., channel width (w)=~120% of the LDU width). For an LDU having a width (w) of about 300 μm, for example, the channel 610 can have a width, w, of about 360 μm. In general, the channel 610 can have a length, l, that extends between an inner diameter the magnetic recording disk and the landing pad of the drive. For example, the channel 610 can have a length, l, between about 27 mm to 30 mm (over a full operating stroke of about 49 degrees).

Figure 7:
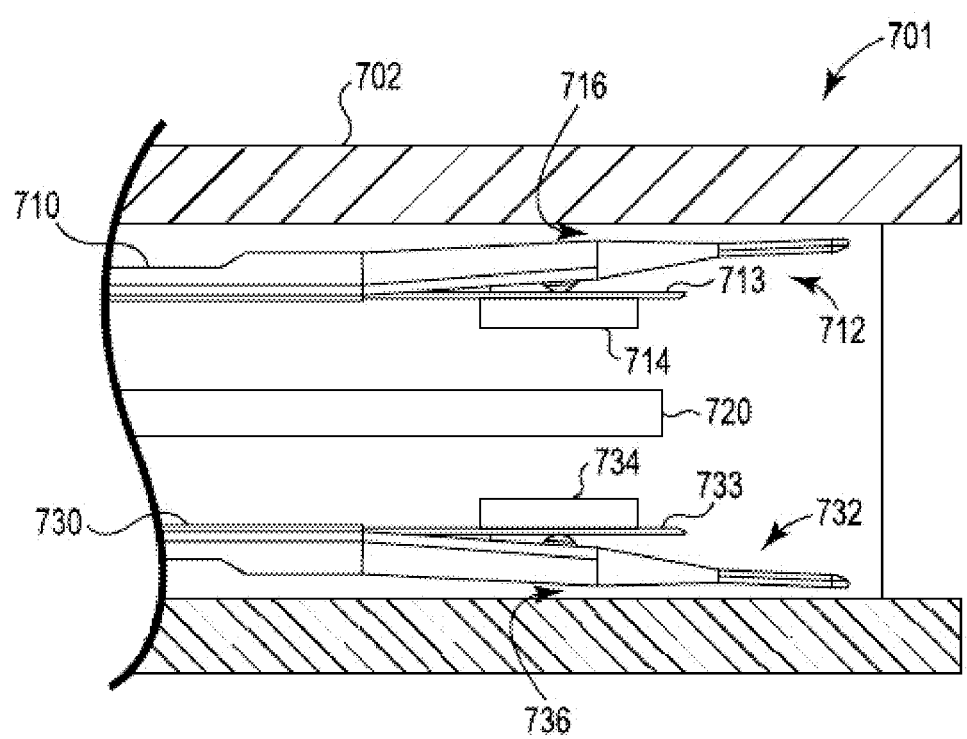
FIG. 7 is a cross-sectional view of a conventional low form factor hard drive including various components disposed within an enclosure comprising a cover and a base.

FIG. 7 is a cross-sectional view of a conventional low form factor hard drive including various components disposed within an enclosure 701 comprising a cover 702 and base 704. The conventional hard drive shown in FIG. 7 includes an upper actuator arm 710, a lower actuator arm 730, and a magnetic recording disk 720 positioned between the upper and lower actuator arms 710 and 730. An upper HGA 712 and suspension 713/slider 714 are situated at a distal end of the upper actuator arm 710. A lower HGA 732 and suspension 733/slider 734 are situated at a distal end of the lower actuator arm 730. As can be seen in FIG. 7, an appreciable gap 716 is provided between the upper HGA 712 and cover 702 to accommodate vertical displacement of the upper HGA 712 during manufacture and operation. Similarly, an appreciable gap 736 is provided between the lower HGA 732 and the base 704 to accommodate vertical displacement of the lower HGA 732 during manufacture in operation.

Figure 8:
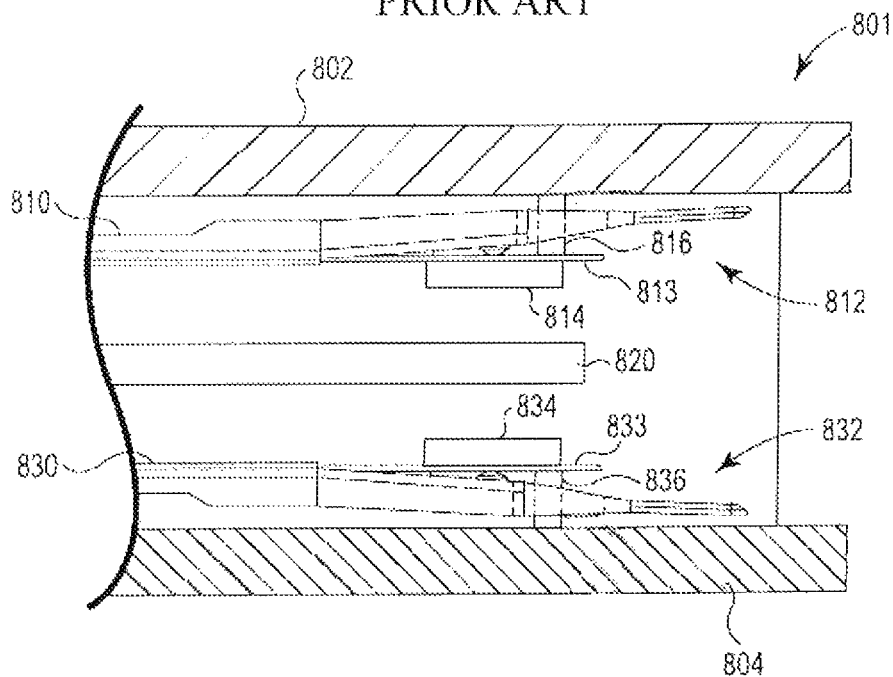
FIG. 8 is a cross-sectional view of a conventional low form factor hard drive enclosure into which HAMR drive components are installed for illustrative purposes.

FIG. 8 is a cross-sectional view of a conventional low form factor hard drive enclosure 801 into which HAMR drive components are installed for illustrative purposes. Conventional enclosure 801 includes a cover 802 and a base 804. The HAMR drive components include a first actuator arm 810, a second actuator arm 830, and a magnetic recording disk 820 disposed therebetween and configured for heat-assisted magnetic recording. A first HGA 812 and suspension 813/slider 814 are situated at a distal end of the upper actuator arm 810. A second HGA 832 and suspension 833/slider 834 are situated at a distal end of the lower actuator arm 830. A first LDU 816 of the first HGA 812 is shown projecting upwardly from the suspension 813 towards the cover 802. A second LDU 836 of the second HGA 832 is shown projecting downwardly from the suspension 833 towards the base 804. As can be seen in FIG. 8, the first and second LDUs 816 and 836 are in contact with the cover 802 and base 804, respectively, due to the limited height available in the low form factor hard drive enclosure 801. More particularly, the first and second LDUs 816 and 836 are either in contact or easily make contact with the cover 802 and base 804 of a low form factor enclosure 801 due to the inability of the enclosure 801 to accommodate the height dimension of the LDUs 816 and 836.

Figure 9:
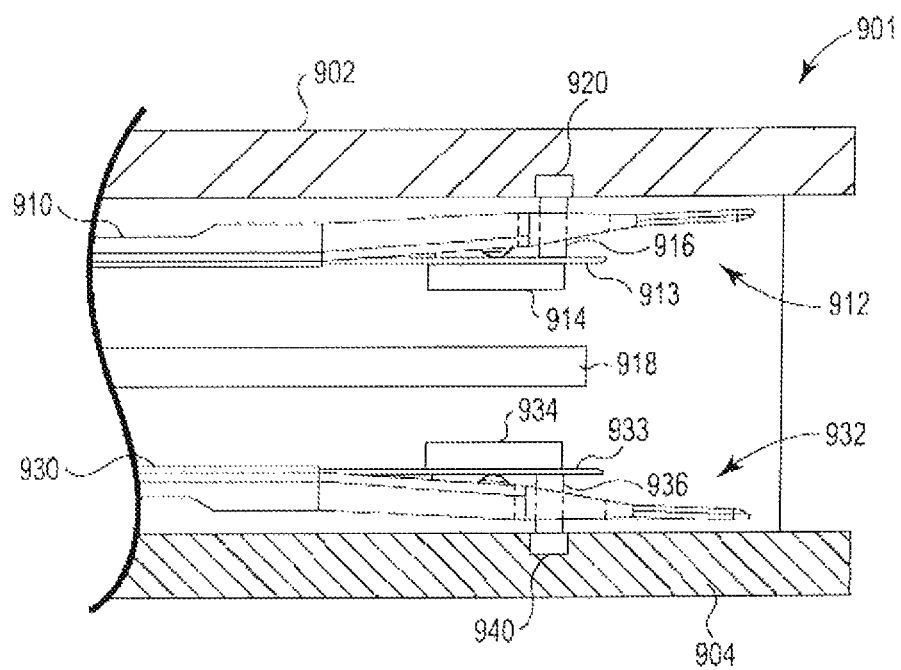
FIG. 9 is a cross-sectional view of a low form factor HAMR hard drive enclosure 901 in accordance with various embodiments.

FIG. 9 is a cross-sectional view of a low form factor HAMR hard drive enclosure 901 in accordance with various embodiments. The HAMR components housed within the enclosure 901 shown in FIG. 9 are essentially the same as those shown in FIG. 8. The enclosure 901 includes a cover 902 and a base 904. In some embodiments, the enclosure 901 can have a 7 mm (height) form factor. In other embodiments, the enclosure 901 can have a 5 mm (height) form factor. The HAMR drive components include a first actuator arm 910, a second actuator arm 930, and a HAMR disk 918 disposed between the first and second actuator arms 910 at 930.

A first HGA 912 and suspension 913/slider 914 are situated at a distal end of the upper actuator arm 910. A first LDU 916 of the first HGA 912 is shown projecting upwardly from the suspension 913 towards the cover 902. A first arcuate channel 920 is provided in the cover 902 and dimensioned to accommodate at least the distal portion of the first LDU 916. Any vertical displacement of the first LDU 916 due to pinch force testing during manufacture or shock during operation can be accommodated by the void in the cover 902 adjacent the first LDU 916 provided by the first channel 920. It is noted that the depth of the first channel 920 can be selected to accommodate the distal portion of the first LDU 916 should the first HGA 912 make contact with the surface of the cover 902. As such, contact between the first LDU 916 and the cover 902 is prevented even if the first HGA 912 makes contact with the cover 902.

A second HGA 932 and suspension 933/slider 934 are situated at a distal end of the lower actuator arm 930. A second LDU 936 of the second HGA 932 is shown projecting downwardly from the suspension 933 towards the base 904. A second arcuate channel 940 is provided in the base 904 and dimensioned to accommodate at least the distal portion of the second LDU 936. Any vertical displacement of the second LDU 936 due to pinch force testing during manufacture or shock during operation can be accommodated by the void in the base 904 adjacent the second LDU 936 provided by the second channel 940. It is noted that the depth of the second channel 940 can be selected to accommodate the distal portion of the second LDU 936 should the second HGA 932 make contact with the surface of the base 904. As such, contact between the second LDU 936 and the base 904 is prevented even if the second HGA 932 makes contact with the base 904.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
    a heat-assisted magnetic recording drive, comprising:
        an enclosure comprising a base and a cover;
        a magnetic recording disk;
        a first head gimbal assembly (HGA) proximate the cover and supporting a first slider assembly comprising a first laser diode unit (LDU), the first LDU projecting away from the first HGA towards the cover;
        a second HGA proximate the base and supporting a second slider assembly comprising a second LDU, the second LDU projecting away from the second HGA towards the base;
        a first arcuate channel provided in the cover and dimensioned to receive a distal portion of the first LDU, the first channel having a length that accommodates the distal portion of the first LDU along a stroke of the first HGA; and
        a second arcuate channel provided in the base and dimensioned to receive a distal portion of the second LDU, the second channel having a length that accommodates the distal portion of the second LDU along a stroke of the second HGA.

2. The apparatus of claim 1, wherein the first and second channels have a generally square or rectangular cross-section.

3. The apparatus of claim 1, wherein:
    the first channel has a depth greater than a height of the distal portion of the first LDU that extends beyond the first HGA; and
    the second channel has a depth greater than a height of the distal portion of the second LDU that extends beyond the second HGA.

4. The apparatus of claim 1, wherein:
    the first channel has a depth greater than about 120% of a height of the distal portion of the first LDU that extends beyond the first HGA; and
    the second channel has a depth greater than about 120% of a height of the distal portion of the second LDU that extends beyond the second HGA.

5. The apparatus of claim 1, wherein:
    the first channel has a width that is greater than a width of the first LDU by at least about 20%; and
    the second channel has a width that is greater than a width of the second LDU by at least about 20%.

6. The apparatus of claim 1, wherein the first and second channels have a length that extends between an inner diameter of the disk and a landing pad of the drive.

7. The apparatus of claim 1, wherein the first and second channels have a length ranging from about 27 mm to 30 mm.

8. The apparatus of claim 1, wherein:
    the first LDU comprises a first laser diode connected to a first submount;
    the second LDU comprises a second laser diode connected to a second submount.

9. The apparatus of claim 1, wherein the enclosure has a height of 7 mm.

10. The apparatus of claim 1, wherein the enclosure has a height of 5 mm.

11. An apparatus, comprising:
    a heat-assisted magnetic recording drive, comprising:
        an enclosure comprising a base and a cover;
        a magnetic recording disk;
        at least one head gimbal assembly (HGA) proximate one of the base and the cover, the HGA comprising:
            a load beam having a first surface, a second surface opposing the first surface, and an aperture;
            a suspension connected to the second surface of the load beam and configured to support a slider assembly comprising a laser diode unit (LDU), the LDU extending through the aperture of the load beam and projecting away from the first surface toward one of the base and the cover; and
            an arcuate channel provided in one of the base and the cover, the channel dimensioned to receive a distal portion of the LDU and having a length that accommodates the distal portion of the LDU along a stroke of the HGA.

12. The apparatus of claim 11, wherein channel has a generally square or rectangular cross-section.

13. The apparatus of claim 11, wherein the channel has a depth greater than a height of the distal portion of the LDU that extends beyond the HGA.

14. The apparatus of claim 11, wherein the channel has a depth greater than about 120% of a height of the distal portion of the LDU that extends beyond the HGA.

15. The apparatus of claim 11, wherein the channel has a width that is greater than a width of the LDU by at least about 20%.

16. The apparatus of claim 11, wherein the channel has a length that extends between at least an inner diameter and an outer diameter of the disk.

17. The apparatus of claim 11, wherein the channel has a length ranging from about 27 mm to 30 mm.

18. The apparatus of claim 1, wherein the LDU comprises a laser diode connected to a first submount.

19. The apparatus of claim 1, wherein the enclosure has a height of 7 mm.

20. The apparatus of claim 1, wherein the enclosure has a height of 5 mm.

* * * * *